Dec. 9, 1952    R. J. CHAMPAYNE    2,620,775
RECIPROCATING MACHINE
Filed Feb. 1, 1946    3 Sheets-Sheet 1
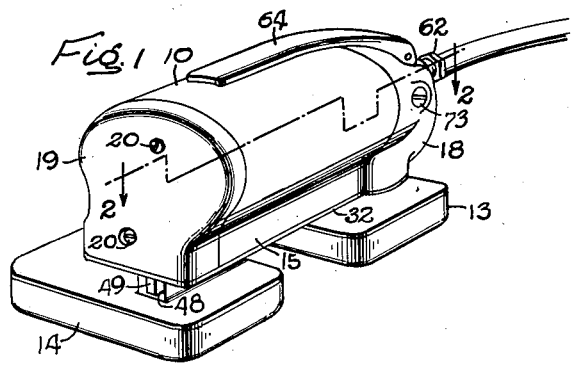
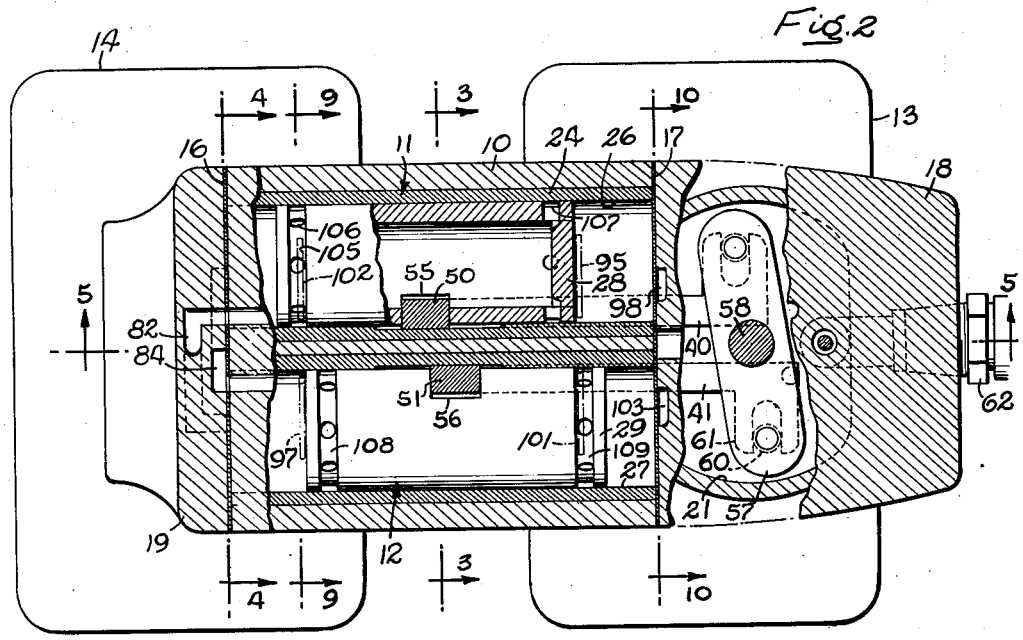
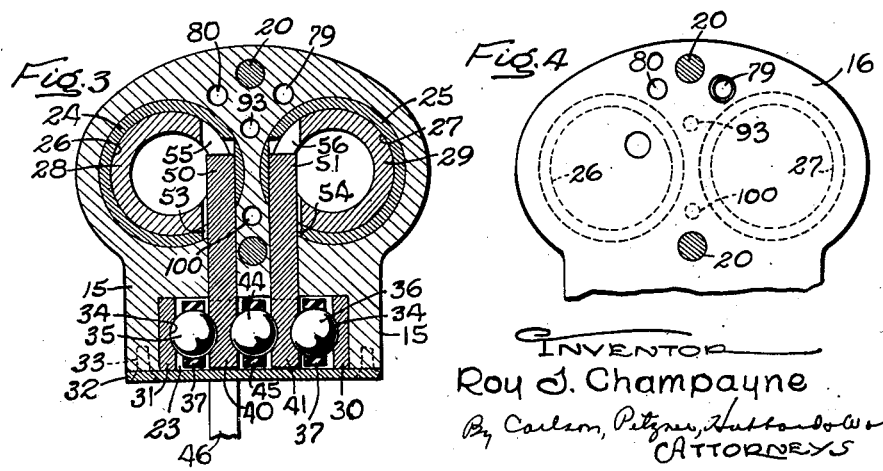
INVENTOR
Roy J. Champayne
By Carlson, Pitzner, Hubbard & Wolfe
ATTORNEYS Dec. 9, 1952     R. J. CHAMPAYNE     2,620,775
RECIPROCATING MACHINE
Filed Feb. 1, 1946     3 Sheets-Sheet 2
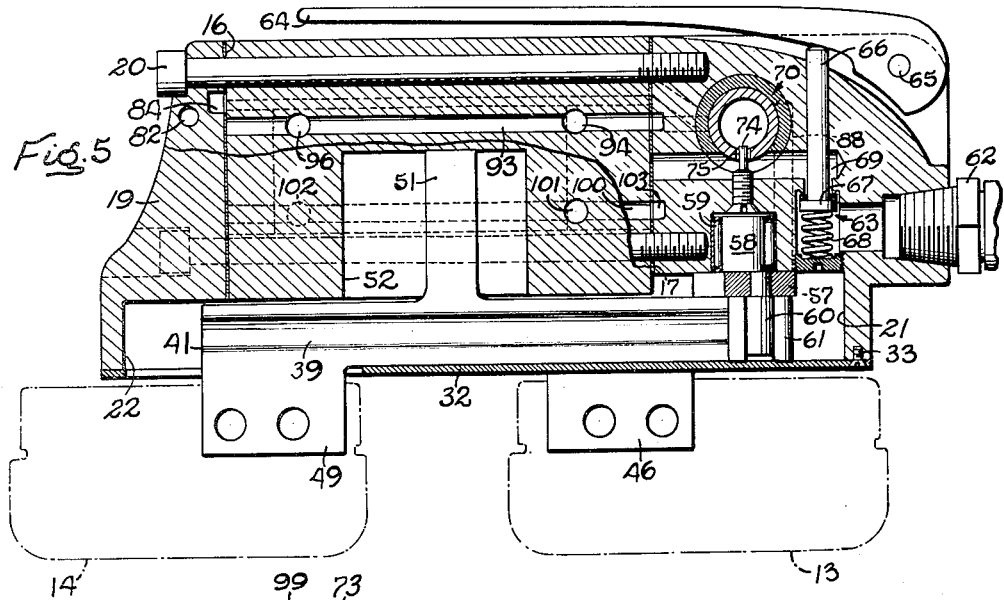
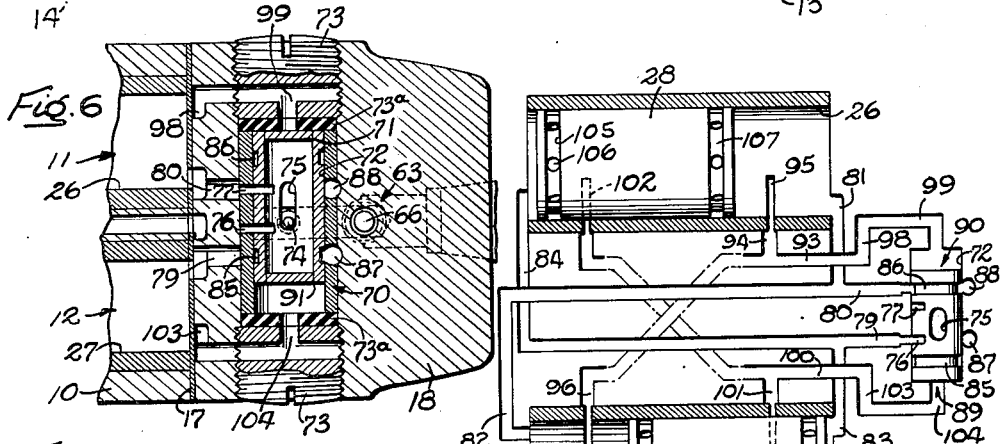
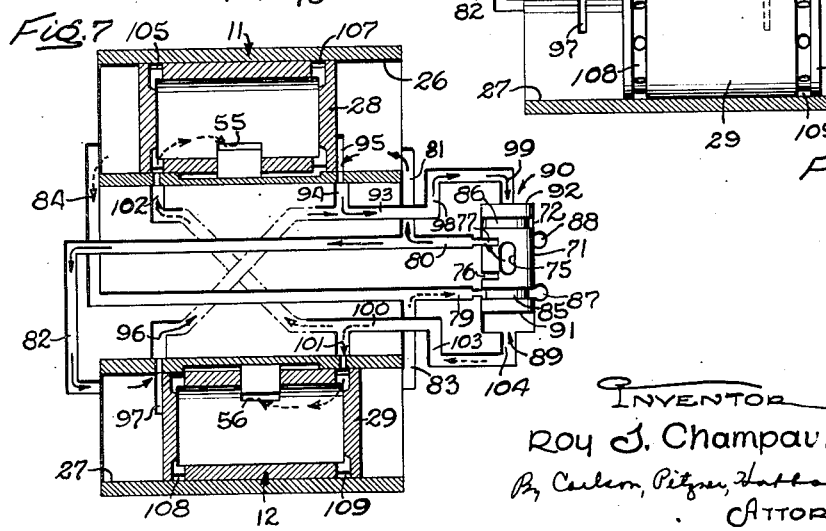
INVENTOR
Roy J. Champayne Dec. 9, 1952  R. J. CHAMPAYNE  2,620,775
RECIPROCATING MACHINE
Filed Feb. 1, 1946  3 Sheets-Sheet 3
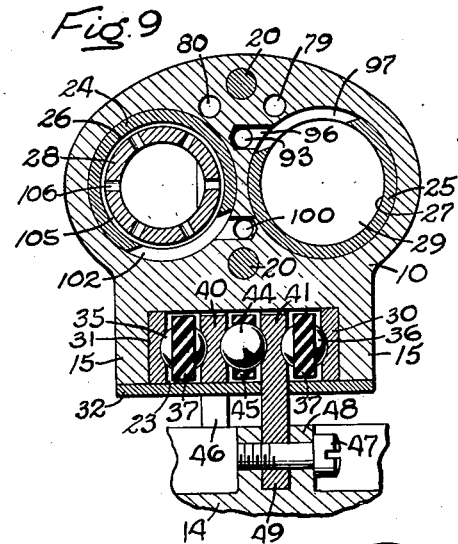
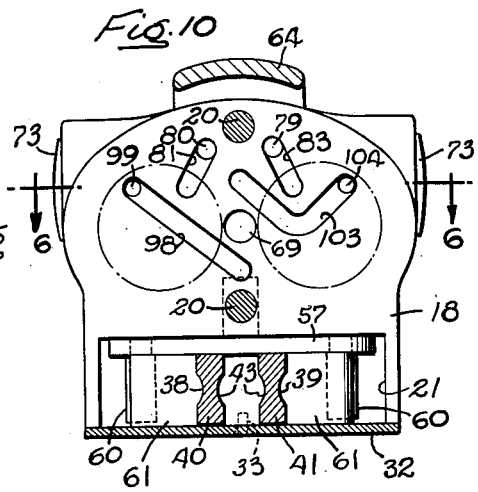
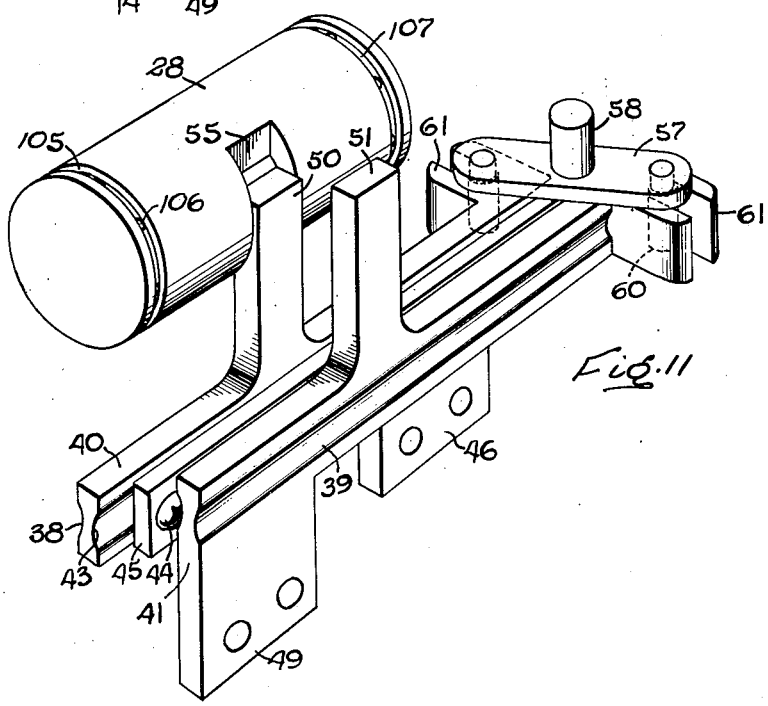
INVENTOR
Roy J. Champayne
By Carlson, Pitzner, Hubbard Wolfe
ATTORNEYS Patented Dec. 9, 1952

2,620,775

UNITED STATES PATENT OFFICE 2,620,775

RECIPROCATING MACHINE

Roy J. Champayne, Rockford, Ill.

Application February 1, 1946, Serial No. 644,725

2 Claims. (Cl. 121—3)

1

This invention relates to reciprocating machines, particularly those of the pneumatically actuated type.

The general object is to provide a portable reciprocating machine which is lighter in weight and of greater capacity and efficiency than machines of similar type heretofore produced.

Another object is to provide a reciprocating machine in which two reciprocating parts are mounted and guided in a novel manner on a supporting body for reciprocation by a pneumatic operator on the body.

A further object is to arrange the reciprocating parts in end to end relation and actuate the same in a novel manner by two pneumatic operators having their cylinders arranged side by side above the parts.

Other objects and advantages of the invention will become apparent from the following detailed description taken in connection with the accompanying drawings, in which Figure 1 is a perspective view of a rubbing machine embodying the novel features of the present invention.

Fig. 2 is a longitudinal section taken along the broken line 2—2 of Fig. 1.

Figs. 3, 4 and 5 are sections taken respectively along the lines 3—3, 4—4 and 5—5 of Fig. 2.

Fig. 6 is a fragmentary sectional view taken along the line 6—6 of Fig. 10.

Figs. 7 and 8 are diagrammatic views of the pneumatic operators and their control circuits.

Figs. 9 and 10 are sectional views taken respectively along the lines 9—9 and 10—10 of Fig. 2.

Fig. 11 is a fragmentary perspective view of the supporting slides for the rubbing shoes.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The improved rubbing machine shown in the drawings for purposes of illustration comprises generally a body 10 proper constituting a housing for pneumatic operators 11 and 12 and a pair of rubbing shoes 13 and 14 beneath the body slidably supported by the latter and reciprocated by the respective operators. The body 10 is a casting of lightweight material having a top portion generally oval-shaped in cross section so as to constitute a hand grip and a narrower bottom part formed by parallel flanges 15 laterally spaced apart to provide a recess 23 in which the shoe supporting and guiding structure is disposed. The ends of the body are flat and separated by gaskets 16 and 17 from the flat surfaces of castings 18 and 19 which constitute rear and front end caps for the body, the three being clamped together in end-to-end abutment by tie rods 20. Recesses 21 and 22 in the bottom of the caps register with and constitute extensions of the bottom slot 23 in the body 10.

The top portion of the body is bored from end to end to receive sleeves 24 and 25 which have internal bores 26 and 27 slidably supporting pistons 28 and 29 which cooperate with the bores to form the pneumatic operators 11 and 12 for the rubbing shoes. The pistons are somewhat shorter than their cylinders, and herein are made hollow to reduce their weight and form part of air passages later to be described. The gaskets 16 and 17 backed by the flat end surfaces of the caps 18 and 19 close the ends of the two cylinders.

The rubbing shoes are individually supported for reciprocatory motion by an elongated antifriction bearing and guide structure disposed in the bottom recess 23 of the body and the cap extensions thereof. This structure includes two bars 30 and 31 disposed adjacent the flanges 15 on the inner sides thereof and held in the body recess 23 by a clamping plate 32 secured as by a plurality of screws 33 to the flanges. Longitudinal grooves 34 are formed on the inner sides of these bars to provide raceways for two rows of antifriction elements or balls 35 and 36 held in spaced relation by apertured retainer strips 37. The opposite sides of the balls 35 and 36 seat in raceways 38 and 39 on the outer surfaces of two slides 40 and 41 in the form of flat bars of substantially greater length than the pistons and the body 10. The adjacent sides of these slides are grooved to form raceways 43 for a third row of balls 44 held in spaced relation by a retainer strip 45.

A lug 46 formed integral with and depending from one end of the slide 41 is rigidly secured by screws 47 to a flange 48 upstanding from the rubbing shoe 14. A lug 49 intermediate the ends of the slide 40 is similarly secured to the shoe 13.

To connect each rubbing shoe with its individual pneumatic operator, the slides 40 and 41 are formed with integral lugs 50 and 51 which project upwardly through vertical slots 52 milled in the body 10 and intersecting the adjacent sides of the sleeves 24 and 25 forming segmental slots 53 and 54 in the cylinders 26 and 27, these slots extending longitudinally of the cylinders a distance greater than the stroke of the pistons. The adjacent sides of the pistons are formed midway between their ends with segmental slots 55 and 56 which receive the upper ends of the lugs 50 and 51. In this instance, the piston slots are of slightly greater thickness than the lugs so that the hollow piston and its associated body slot 52 may be used as an exhaust air passage.

By locating the anti-friction bearing guides between the actuating pistons and the rubbing shoes as above described, it will be observed that relatively long guide surfaces may be employed, which surfaces, when the anti-friction bearing surfaces are fitted closely, hold the shoes accurately against tilting under the force couple formed by the piston force on the upstanding lugs and the work resistance against the bottom of the shoes. By disposing the lugs 46, 49, 50 and 51 in the planes of the slides 40 and 41 and by connecting the slides to the adjacent sides of the two pistons, the slides may be located relatively close together, and therefore may be connected to the shoes close to the longitudinal center lines of the latter. Also, the pistons, being mounted side by side, may be of substantial length and therefore not subject to tilting in their cylinders. The three rows of balls and their cooperating raceways arranged as above described form an effective lateral thrust bearing for transmitting to the shoes the downwardly directed pressure manually applied to the body 10 in the normal use of the rubbing machine.

The pistons 28 and 29 are moved in opposite directions simultaneously in each of their strokes. To insure that the two will always move corresponding distances and in perfect synchronism, they are preferably joined mechanically by a connection whose parts are disposed in the bottom recess 21 of the end cap 18. This connection comprises a lever 57 extending transversely of the body and having an upstanding stud 58 received in an anti-friction bearing 59 in the cap 18. Studs 60 depending from opposite ends of the lever are received in bifurcated heads 61 on opposite ends of the slides 40 and 41.

Air at the proper pressure is supplied to the machine through a flexible hose connection leading into a tapped fitting 62 in the outer end of the rear cap 18. The admission of compressed air is controlled by a valve 63 which is opened and closed in response to the depression and release of an arm 64 pivoted at 65 on the cap 18 and projecting forwardly along the top of the body 10 so that it may be actuated by the operator's hand holding the machine or guiding it along the work. Near its pivot, the arm 64 bears downwardly against the upstanding stem 66 of a valve member 67 which is urged against its seat by a spring 68. When the valve is opened, air flows into a passage 69 from which it is distributed to the two cylinders 26 and 27 by a valve 70 mounted in the cap 18 and, in accordance with the present invention, actuated pneumatically.

The distributing valve comprises a hollow plunger 71 slidable in a cylinder 72 closed at its opposite ends by plugs 73 and extending transversely of the cap 18 and the upper portion thereof. The plunger is held against turning by a screw 74 whose upper end projects into a slot 75 in the plunger which constitutes the valve inlet and communicates continuously with the air supply passage 69. On its forward side, the plunger 71 is formed with two slot-type ports 76 and 77 which, in opposite limit positions of the plunger (Figs. 7 and 8), register respectively with the rear ends of passages 79 and 80 that are drilled lengthwise in the cap 18 and the upper part of the body 10. Through a cross passage 81 (Fig. 10) milled in the flat end of the cap 18, the passage 80 is in continuous communication with the adjacent end of the cylinder 26 while the remote end of the passage 80 communicates through a cross passage 82 in the cap 19 with the remote end of the cylinder 27. In a similar way, the hole 79 communicates through cross passages 83 (Fig. 10) and 84 (Fig. 2) with the near and remote ends of the cylinders 27 and 26, the passage 84 being a recess milled in the face of the cap 19.

Annular grooves 85 and 86 around the valve plunger 71 are spaced farther apart than the holes 79 and 80 and, in the opposite limit positions of the plunger (Figs. 7 and 8), register with the holes, thereby connecting the latter to one or the other of two exhaust ports 87 and 88 which open into the valve cylinder 72 and extend downwardly to the bottom recess 21 in the cap 18. Thus, while air is being delivered to the valve through one of the holes 79 and 80, the other hole is connected to one of the exhaust ports 87 and 88.

The valve plunger 71 is shifted back and forth between its opposite limit positions in response to the selective energization of individual pneumatic actuators 89 and 90 comprising the end portions of the plunger cylinder 72 and pistons formed by opposite ends 91 and 92 of the plunger 71. Alternate energization of the valve actuators takes place in the final portions of the successive strokes of the rubbing shoes. Herein, the main pistons 28 and 29 themselves are utilized as the movable members of such valves and, in each of their strokes, operate to energize one of the valve actuators 89 and 90 while simultaneously but momentarily venting the other valve actuator. To this end, a hole 93 drilled lengthwise of the body 10 communicates through a cross passage 94 with a narrow port 95 in the cylinder 26, which port is uncovered by the piston 28 (see Fig. 7) after the latter has traversed about two-thirds of its forward stroke. The hole 93 also communicates through a cross passage 96 with a port 97 in the cylinder 27, this port being uncovered by the piston 29 at the same time that the port 95 is uncovered by the piston 28. At the end of the body 10, the hole 93 communicates with a recess 98 in the end of the cap 18 and is connected by a hole 99 (Fig. 6) with the cylinder of the valve actuator 90. A similar hole 100 extending through the body 10 is cross connected to ports 101 and 102 correspondingly positioned short of the near and remote ends of the cylinders 27 and 26 so as to be uncovered in the reverse motions of the pistons 28 and 29 after two-thirds of the strokes have been completed. The hole 100 communicates through a recess 103 and a hole 104 with the cylinder of the valve actuator 89.

To permit the plunger 71 to move when either one of the actuators 89 and 90 is energized, the other actuator is vented simultaneously but for an interval only sufficient to allow the valve plunger 71 to be moved by its energized actuator. Herein, such venting is also accomplished by valves formed in part by the main pistons 28 and 29, the venting being through passages on the piston itself. To this end, a groove 105 is formed around the piston 28 short of one end thereof, so as to register with the port 102 at the same time that the port 95 is uncovered by the piston. Through holes 106 and the hollow piston, the groove communicates continuously through the piston slot 55 with the body slots 52 through which the air may escape downwardly. Thus, in the position of the piston 29 shown in Figs. 2 and 7, the valve actuator 89 is vented through the passage 100, the port 102 and the groove 105. A similar groove 107 in the other end of the cylinder 28 is adapted to register with the port 95 when the port 102 is uncovered in the reverse stroke of the piston, the actuator 90 then being vented through the hole 93, the port 95, the piston groove 107 and holes in the bottom thereof communicating with the interior of the piston which, as mentioned above, is always vented.

Similar grooves 108 and 109 formed around the piston 29 communicate through holes with the vented interior of the piston and register with the ports 97 and 101 respectively at the same times that the grooves 105 and 107 register with the ports 95 and 102 respectively. By thus providing a duplicate set of supply and exhaust valves for controlling the energization and the venting of the valve actuators 89 and 90, the forces applied to the main pistons and therefore to the rubbing shoes are rendered more uniform.

The operation of the rubbing machine above described is as follows, assuming that the control valve 63 is held open and starting with the parts positioned as shown in Figs. 2, 5, 6 and 7 in which the valve plunger 71 is in its right-hand position, the pistons 28 and 29 having advanced through two-thirds of their forward and return strokes respectively. As shown by the full-line arrows in Fig. 7, compressed air from the supply passage 69 is being delivered through the valve plunger 71 and the passage 80 to the rear and forward ends of the cylinders 27 and 26 and is being exhausted through the passage 79 and the exhaust port 87 of the valve, as indicated by the dotted arrows. Since the pistons 28 and 29 have advanced far enough to uncover the ports 95 and 97, air under pressure is being supplied through the passage 93 to the right-hand end of the valve cylinder 72, as is also indicated by the full-line arrows. The valve actuator 90 is thus energized at the same time the actuator 90 is being vented through the passage 100 and the cylinder ports 101 and 102 which are at this instant in register with the piston grooves 109 and 105. The piston 71 is thus quickly moved by the actuator 90 to its other limit position (Fig. 8) as the motions of the piston 28 and 29 continue so as to carry the grooves 105 and 109 past the ports 101 and 102, thereby disconnecting the passage 100 from the exhaust outlet through the pistons.

After shifting of the valve to the position shown in Fig. 8, the air pressure in the forward and rear ends of the cylinders 27 and 26 builds up rapidly to oppose the continued motion of the pistons. Thus, a pneumatic cushioning action is applied to the pistons to interrupt the strokes in the positions shown in Fig. 8, whereupon their motions are reversed immediately by the pressure of the air supplied through the passage 79. During these reverse strokes, the forward and rear ends of the cylinders 26 and 27 are exhausted through the passage 80 and the exhaust port 88 of the valve. After the pistons 28 and 29 have moved through two-thirds of their strokes, the grooves 107 and 108 come into register with the ports 95 and 97, thereby venting the valve actuator 89. The cylinder ports 101 and 102 are uncovered by the pistons, whereupon air is admitted through the passage 100 to energize the valve actuator 89. The valve plunger 71 is thus shifted to the position shown in Fig. 7 and the procedure above described of cushioning, stopping and reversing the piston motions is repeated.

With the parts constructed and arranged as above described, it is possible to reduce the overall size of the rubbing machine and increase the lengths of the shoe strokes as compared to prior portable rubbing machines. The present machine has an over-all length of seven inches, weighs five pounds, makes 2000 three-quarter-inch strokes per minute, the diameters of the pistons being one inch.

I claim as my invention:

1. In a machine of the character described, the combination of, an elongated body having a pair of cylinders therein closely spaced side by side adjacent the top of said body, pistons slidable in said cylinders, two elongated laterally spaced parallel slides disposed below said cylinders, three laterally spaced bearings disposed below said cylinders and engaging the sides of said slides and the bottom of said body to guide the slides for endwise reciprocation parallel to said cylinders, projections upstanding from said slides with their upper ends respectively connected to said pistons, lugs rigid with and depending from said slides at points spaced apart along the slides, an element to be reciprocated disposed below said body, means rigidly connecting the top of said element to one of said lugs, a member substantially equal in weight to said element, means rigidly connecting said member to said other lug, and valve means responsive to the movements of said element for admitting pressure fluid alternately to opposite ends of said cylinders to cause reciprocation of said element and said member simultaneously but in opposite directions.

2. In a machine of the character described, the combination of, an elongated body having a pair of cylinders therein closely spaced side by side adjacent the top of said body, pistons slidable in said cylinders, two elongated laterally spaced parallel slides disposed below said cylinders, a rocker arm extending transversely of the ends of said slides and fulcrumed between said slides and intermediate its ends on said body to rock parallel to the plane of reciprocation of the slides, means pivotally connecting opposite ends of said rocker arm to the respective slides, three laterally spaced bearings disposed below said cylinders and engaging the sides of said slides and the bottom of said body to guide the slides for endwise reciprocation parallel to said cylinders, projections upstanding from said slides with their upper ends respectively connected to said pistons, lugs rigid with and depending from said slides at points spaced apart along the slides, an element to be reciprocated disposed below said body, means rigidly connecting the top of said element to one of said lugs, a member substantially equal in weight to said element, means rigidly connecting said member to said other lug, and valve means responsive to the movements of said element for admitting pressure fluid alternately to opposite ends of said cylinders to cause reciprocation of said element and said member simultaneously but in opposite directions.

ROY J. CHAMPAYNE.

REFERENCES CITED

The following references are of record in the file of this patent:

UNITED STATES PATENTS

| Number | Name | Date |
|---|---|---|
| 812,119 | Denson | Feb. 6, 1906 |
| 1,436,939 | Brown | Nov. 28, 1922 |
| 1,493,650 | Sundstrand | May 13, 1924 |
| 1,495,333 | Krüger | May 27, 1924 |
| 1,711,811 | Rudlin | May 7, 1929 |
| 1,747,396 | Scott | Feb. 18, 1930 |
| 1,887,620 | Bowlby | Nov. 15, 1932 |
| 2,050,960 | Olivetti | Aug. 11, 1936 |
| 2,224,140 | Champayne | Dec. 10, 1940 |
| 2,328,918 | McManus | Sept. 7, 1943 |
| 2,400,374 | Selnes | May 14, 1946 |

FOREIGN PATENTS

| Number | Country | Date |
|---|---|---|
| 208,765 | Great Britain | Dec. 27, 1923 |
| 609,836 | France | Aug. 5, 1926 |